United States Patent [19]

Sakurada et al.

[11] 4,103,308

[45] Jul. 25, 1978

[54] DIGITAL INFORMATION INPUT METHOD

[75] Inventors: Nobuaki Sakurada, Yokohama;
Masaharu Kawamura, Hino;
Nobuhiko Shinoda, Tokyo; Tadashi
Ito, Yokohama; Hiroyashu
Murakami, Tokyo; Fumio Ito,
Yokohama, all of Japan

[73] Assignee: Canon Kabushiki Kaisha, Tokyo, Japan

[21] Appl. No.: 679,908

[22] Filed: Apr. 23, 1976

[30] Foreign Application Priority Data

Apr. 30, 1975 [JP] Japan ................................ 50-53043

[51] Int. Cl.² ............................................. G03B 7/08
[52] U.S. Cl. .................................. 354/23 D; 354/60 A
[58] Field of Search ........................... 354/23 D, 60 A; 340/347 R, 347 DD; 235/159, 155

[56] References Cited

U.S. PATENT DOCUMENTS 4,037,233   7/1977   Shinoda et al. ................... 354/23 D

FOREIGN PATENT DOCUMENTS 2,538,144   3/1976   Fed. Rep. of Germany .... 354/23 D Primary Examiner—Russell E. Adams
Attorney, Agent, or Firm—Toren, McGeady and Stanger

[57] ABSTRACT

A plural number of switches which are selectively opened and closed comprise a first switch corresponding with the weight "⅔" in APEX value and a second switch corresponding with the weight "⅓" in APEX value while a n bit register comprises a first bit with the weight "½" in APEX value, a second bit with the weight "¼" in APEX value and a third bit with the weight "⅛" in APEX value. The closing signal of the first switch is put in the first bit, the closing signal of the second switch in the second bit and the closing signal of the third switch in the third bit so as to carry out the approximate conversion of the data.

4 Claims, 7 Drawing Figures

FIG.1

| EXPOSURE TIME SECOND Tv | | APERTURE VALUE F-NUMBER Av | | FILM SPEED ASA Sv | | OBJECT LUMINANCE FOOT LAMBEARTS Bv | |
|---|---|---|---|---|---|---|---|
| 1 | 0 | 1.0 | 0 | 3 | 0 | 1 | 0 |
| 1/2 | 1 | 1.4 | 1 | 6 | 1 | 2 | 1 |
| 1/4 | 2 | 2.8 | 2 | 12 | 2 | 4 | 2 |
| 1/8 | 3 | 4.0 | 3 | 25 | 3 | 8 | 3 |
| 1/16 | 4 | 5.6 | 4 | 50 | 4 | 16 | 4 |
| 1/30 | 5 | 8.0 | 5 | 100 | 5 | 32 | 5 |
| 1/60 | 6 | 11.0 | 6 | 200 | 6 | 64 | 6 |
| 1/125 | 7 | 16.0 | 7 | 400 | 7 | 125 | 7 |
| 1/250 | 8 | 22.0 | 8 | 800 | 8 | 250 | 8 |
| 1/500 | 9 | 32.0 | 9 | 1600 | 9 | 500 | 9 |
| 1/1000 | 10 | | | 3200 | 10 | 1000 | 10 |
| 1/2000 | 11 | | | 6400 | 11 | 2000 | 11 |
| | | | | 12500 | 12 | 4000 | 12 |

FIG.2

| a8 | a4 | a2 | a1 | $a\frac{1}{2}$ | $a\frac{1}{4}$ | $a\frac{1}{8}$ |
|---|---|---|---|---|---|---|

ABOVE "1" STEP IN THE APEX VALUE    BELOW "1" STEP IN THE APEX VALUE

| Sv | 8 | 4 | 2 | 1 | 1/2 | 1/4 | 1/8 |
|---|---|---|---|---|---|---|---|
| 0 | 0 | 0 | 0 | 0 | 0 | 0 | 0 |
| 1/3 | 0 | 0 | 0 | 0 | 0 | 1 | 1 |
| 2/3 | 0 | 0 | 0 | 0 | 1 | 0 | 1 |
| 1 | 0 | 0 | 0 | 1 | 0 | 0 | 0 |
| 1 1/3 | 0 | 0 | 0 | 1 | 0 | 1 | 1 |
| 1 2/3 | 0 | 0 | 0 | 1 | 1 | 0 | 1 |
| 2 | 0 | 0 | 1 | 0 | 0 | 0 | 0 |
| 2 1/3 | 0 | 0 | 1 | 0 | 0 | 1 | 1 |
| 2 2/3 | 0 | 0 | 1 | 0 | 1 | 0 | 1 |
| 3 | 0 | 0 | 1 | 1 | 0 | 0 | 0 |
| 3 1/3 | 0 | 0 | 1 | 1 | 0 | 1 | 1 |
| 3 2/3 | 0 | 0 | 1 | 1 | 1 | 0 | 1 |
| 4 | 0 | 1 | 0 | 0 | 0 | 0 | 0 |
| 4 1/3 | 0 | 1 | 0 | 0 | 0 | 1 | 1 |
| 4 2/3 | 0 | 1 | 0 | 0 | 1 | 0 | 1 |
| 5 | 0 | 1 | 0 | 1 | 0 | 0 | 0 |
| 5 1/3 | 0 | 1 | 0 | 1 | 0 | 1 | 1 |
| 5 2/3 | 0 | 1 | 0 | 1 | 1 | 0 | 1 |
| 6 | 0 | 1 | 1 | 0 | 0 | 0 | 0 |
| 6 1/3 | 0 | 1 | 1 | 0 | 0 | 1 | 1 |
| 6 2/3 | 0 | 1 | 1 | 0 | 1 | 0 | 1 |
| 7 | 0 | 1 | 1 | 1 | 0 | 0 | 0 |
| 7 1/3 | 0 | 1 | 1 | 1 | 0 | 1 | 1 |
| 7 2/3 | 0 | 1 | 1 | 1 | 1 | 0 | 1 |
| 8 | 1 | 0 | 0 | 0 | 0 | 0 | 0 |
| 8 1/3 | 1 | 0 | 0 | 0 | 0 | 1 | 1 |
| 8 2/3 | 1 | 0 | 0 | 0 | 1 | 0 | 1 |
| 9 | 1 | 0 | 0 | 1 | 0 | 0 | 0 |
| 9 1/3 | 1 | 0 | 0 | 1 | 0 | 1 | 1 |
| 9 2/3 | 1 | 0 | 0 | 1 | 1 | 0 | 1 |
| 10 | 1 | 0 | 1 | 0 | 0 | 0 | 0 |
| 10 1/3 | 1 | 0 | 1 | 0 | 0 | 1 | 1 |
| 10 2/3 | 1 | 0 | 1 | 0 | 1 | 0 | 1 |
| 11 | 1 | 0 | 1 | 1 | 0 | 0 | 0 |
| 11 1/3 | 1 | 0 | 1 | 1 | 0 | 1 | 1 |
| 11 2/3 | 1 | 0 | 1 | 1 | 1 | 0 | 1 |
| 12 | 1 | 1 | 0 | 0 | 0 | 0 | 0 |
| 12 1/3 | 1 | 1 | 0 | 0 | 0 | 1 | 1 |
| 12 2/3 | 1 | 1 | 0 | 0 | 1 | 0 | 0 |

FIG.5

| APEX VALUE Sv | SWITCHING STATE |||||| 
|---|---|---|---|---|---|---|
| | a8 | a4 | a2 | a1 | a2/3 | a1/3 |
| 0 | ○ | ○ | ○ | ○ | ○ | ○ |
| 1/3 | ○ | ○ | ○ | ○ | ○ | ● |
| 2/3 | ○ | ○ | ○ | ○ | ● | ○ |
| 1 | ○ | ○ | ○ | ● | ○ | ○ |
| 1 1/3 | ○ | ○ | ○ | ● | ○ | ● |
| 1 2/3 | ○ | ○ | ○ | ● | ● | ○ |
| 2 | ○ | ○ | ● | ○ | ○ | ○ |
| 2 1/3 | ○ | ○ | ● | ○ | ○ | ● |
| 2 2/3 | ○ | ○ | ● | ○ | ● | ○ |
| 3 | ○ | ○ | ● | ● | ○ | ○ |
| 3 1/3 | ○ | ○ | ● | ● | ○ | ● |
| 3 2/3 | ○ | ○ | ● | ● | ● | ○ |
| 4 | ○ | ● | ○ | ○ | ○ | ○ |
| 4 1/3 | ○ | ● | ○ | ○ | ○ | ● |
| 4 2/3 | ○ | ● | ○ | ○ | ● | ○ |
| 5 | ○ | ● | ○ | ● | ○ | ○ |
| 5 1/3 | ○ | ● | ○ | ● | ○ | ● |
| 5 2/3 | ○ | ● | ○ | ● | ● | ○ |
| 6 | ○ | ● | ● | ○ | ○ | ○ |
| 6 1/3 | ○ | ● | ● | ○ | ○ | ● |
| 6 2/3 | ○ | ● | ● | ○ | ● | ○ |
| 7 | ○ | ● | ● | ● | ○ | ○ |
| 7 1/3 | ○ | ● | ● | ● | ○ | ● |
| 7 2/3 | ○ | ● | ● | ● | ● | ○ |
| 8 | ● | ○ | ○ | ○ | ○ | ○ |
| 8 1/3 | ● | ○ | ○ | ○ | ○ | ● |
| 8 2/3 | ● | ○ | ○ | ○ | ● | ○ |
| 9 | ● | ○ | ○ | ● | ○ | ○ |
| 9 1/3 | ● | ○ | ○ | ● | ○ | ● |
| 9 2/3 | ● | ○ | ○ | ● | ● | ○ |
| 10 | ● | ○ | ● | ○ | ○ | ○ |
| 10 1/3 | ● | ○ | ● | ○ | ○ | ● |
| 10 2/3 | ● | ○ | ● | ○ | ● | ○ |
| 11 | ● | ○ | ● | ● | ○ | ○ |
| 11 1/3 | ● | ○ | ● | ● | ○ | ● |
| 11 2/3 | ● | ○ | ● | ● | ● | ○ |
| 12 | ● | ● | ○ | ○ | ○ | ○ |
| 12 1/3 | ● | ● | ○ | ○ | ○ | ● |
| 12 2/3 | ● | ● | ○ | ○ | ● | ○ |

○ CLOSING
● OPENING

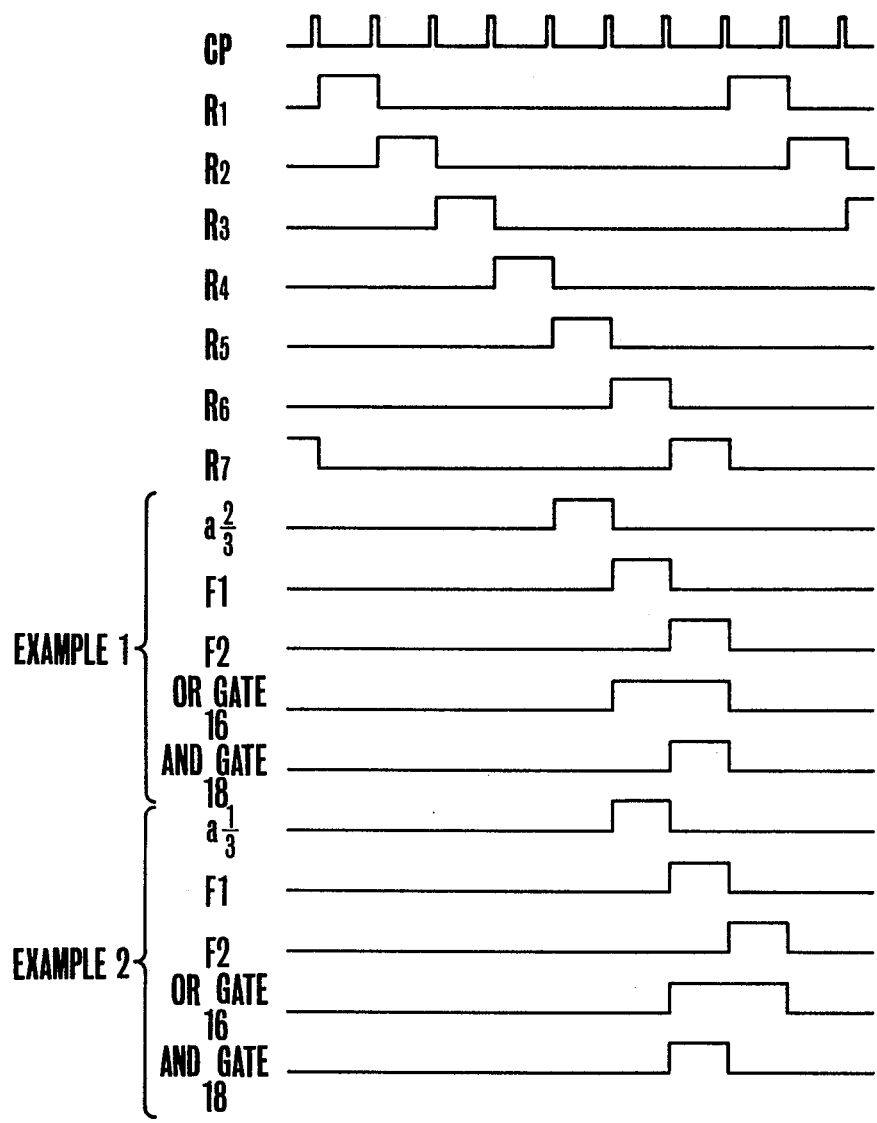

DIGITAL INFORMATION INPUT METHOD

BACKGROUND OF THE INVENTION

1. Field of the Invention

The present invention relates to a digital information input method especially convenient for a camera which is controlled by means of digital information.

2. Description of the Prior Art

Generally, a photographic instrument such as camera is so designed that, for controlling exposure, the information concerning the brightness of the object to be photographed or the speed of the film to be used as well as the set informations concerning the exposure time or the aperture value are put in the exposure operation means so as to control the aperture value or the exposure time. It is typical that such data for the exposure control are once converted into APEX value and operated for the sake of the simplification of operation. The APEX values are the exposure time, the aperture value, the film speed and the object brightness replaced by the arithmetic series system for the sake of the simplification of operation as is shown in FIG. 1. The exposure time is given in seconds, the aperture value given in F.No., the film speed given in ASA sensitivity and the object brightness given in foot lamberts in multiple series system. In the drawing, the values corresponding to the APEX values are represented by Tv for the exposure time, Av for the aperture value, Sv for the film speed and Bv for the object brightness. In accordance with the APEX value series system, it is sufficient to carry out the exposure operation only by addition and subtraction so as to satisfy the following relation so that no matter whether it is carried out electrically or mechanically the exposure operation becomes very simple.

$$Bv + Sv = Tv + Av \quad (1)$$

Even for the recently proposed digital approach to exposure operation the APEX value series system is applicable with remarkable efficiency in view of simplifying the operation device. Although different from the analog system, the theoretical accuracy of the digital system is naturally limited due to the bit capacity of the digital system. In consequence, when it is desired to obtain a certain desired accuracy in the digital system it is sufficient to increase the bits for representing figures below "1" in APEX value, whereby an extremely high accuracy is not necessary if the device error, the measurement error and so on are taken into consideration.

When 7 bits are used for converting the factors for exposure control into APEX values as is shown in FIG. 2, an accuracy up to "⅛" in APEX value can be otained, by giving the weights "1", "2", "4" and "8" respectively to the four bits of the higher order $a_1$, $a_2$, $a_4$ and $a_8$ and the weights "½", "¼" and "⅛" respectively to the three bits of the lower order $a_{½}$, $a_{¼}$ and $a_{⅛}$.

Thus by converting the measured light information, the film speed information, the exposure time information and the aperture value into digital amount of 7 bits as is shown in FIG. 2 so as to carry out the operation for the exposure control, the exposure operation can be carried out with relatively high accuracy.

Thus the value below "1" in APEX value the values "⅛", "2/8", "⅜", "4/8", "⅝", "6/8" and "⅞" can be treated with the three bits of the lower order $a_{½}$, $a_{¼}$ and $a_{⅛}$. Further, it is the present market tendency to set the sensitivity of the film used for the photography in the values by ⅓ of a step in the APEX value. Thus it is necessary to set the film sensitivity by ⅓ step precision in APEX value as ASA 16, 20, 25, 32, 40, 50, 64, 80, 100, 125, 160 and 200.

However, if the factor relative to the film speed is set with ⅓ step precision while other factors for the exposure control are set with ⅛ step precision, the matching between the factors for the digital operation can not be obtained. Therefore, it becomes necessary to adopt a more complicated operation including multiplication and division. If on the other hand, the result of the operation for the actual control is obtained with ⅛ step precision, such complicated operation as mentioned above becomes unnecessary.

A purpose of the present invention is to eliminate the above mentioned shortcoming by converting the data with ⅓ step precision into the data with ⅛ step precision in an approximate way.

Further, another purpose of the present invention will be disclosed by the detailed explanation to be made below in accordance with the embodiments shown in the accompanying drawing.

DESCRIPTION OF THE DRAWINGS

FIG. 1 shows a comparison table between the physical values of various elements for exposure control and the APEX value.

FIG. 2 shows a diagram for explaining the weight of each bit when the APEX values are converted in a digital way with the ⅛ step precision.

FIG. 5 shows a diagram for explaining the opening and the closing of the switches shown in FIG. 4.

FIG. 7 shows a time chart for explaining the operation of the circuit shown in FIG. 6.

DESCRIPTION OF THE PREFERRED EMBODIMENT

The present invention relates to a method wherein the ⅓ step precision such as of the film sensitivity is approximated to with the ⅛ precision data.

Namely, "⅓" and "⅔" can be approximated to with the ⅛ step precision as follows.

$$\tfrac{1}{3} \approx \tfrac{1}{4} + \tfrac{1}{8} = 0.375 \quad (2)$$

$$\tfrac{2}{3} \approx \tfrac{1}{2} + \tfrac{1}{8} = 0.625 \quad (3)$$

whereby the errors are ± 0.042 step, which is with a sufficiently permissible range of error as compared with the ⅛ step, i.e. 0.125 step.

Figures 3, 4:
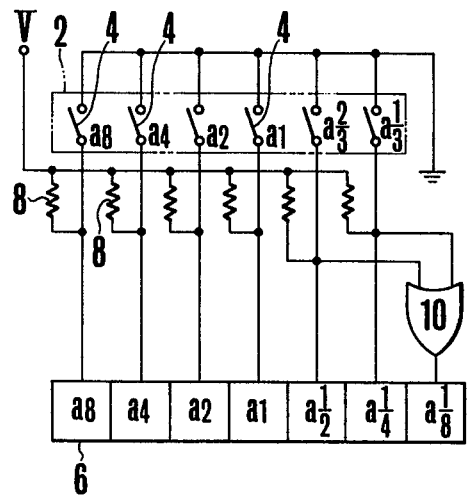
FIG. 3 shows a diagram for explaining the weight of each bit in the case the APEX values with the ⅓ step precision is approximately converted into the digital data with the ⅛ step precision.
FIG. 4 shows a circuit composition in which an embodiment of the digital information input method in accordance with the present invention is applied.

When now in accordance with the relations (2) and (3) the film speeds corresponding to the APEX value are converted into digital values of 7 bits, the results are as shown in FIG. 3.

Although it is desirable to directly put in the film sensitivity with ⅓ step precision in a digital value, not only economically but also from the view point of the switch composition, it is not efficient to put in all the informations with 7 bits by means of mechanical digital switches. It is desirable to decrease the bit number of the switches by same means.

The present invention offers a very effective solution to the above, whereby for the information input of 3 bits representing the informations below "1" step in the APEX value with the $\frac{1}{3}$ step precision, the data with the $\frac{1}{3}$ step precision are approximated to with the data with the $\frac{1}{2}$ step precision by means of the 2 bit switches.

In FIG. 3, as to the information including the $\frac{1}{3}$ step and the $\frac{2}{3}$ step among the APEX values of the film sensitivity, "1" stands for $a\frac{1}{2}$, the bit of the lowest order with $\frac{1}{2}$ weight among the 7 bits while "0" stands for others. Further as to the information including the $\frac{1}{3}$ step "1" stands for $a\frac{1}{4}$, a bit with $\frac{1}{4}$ weight among the 7 bits while as to the information including the $\frac{2}{3}$ step "1" stands for $a\frac{1}{2}$, a bit with $\frac{1}{2}$ weight.

The above is clear from the relations (2) and (3), whereby such characteristics are positively made use of for the digital information entry method in accordance with the present invention in such a manner that as to the 3 bits whose APEX values are below "1", the information can be entered by means of the input switches with 2 bits.

In order to entered a film speed set with $\frac{1}{3}$ step precision by means of digital switches to be selectively opened and closed in functional engagement with the ASA sensitivity-setting dial, the present invention can be realized in the composition as is shown in FIG. 4.

FIG. 4 shows a circuit composition in which an embodiment of the digital information input method in accordance with the present invention is applied whereby 2 is the ASA sensitivity setting dial, 4 a 6 bit switch functionally engaged with the ASA sensitivity setting dial 2 so as to be selectively opened and closed and 6 a 7 bit register for transferring the ASA sensitivity information in APEX value with the $\frac{1}{3}$ step precision. Each bit $a8$, $a4$, $a2$, $a1$, $a\frac{2}{3}$, $a\frac{1}{3}$ of the above mentioned 6 bit switch corresponds with the weight "8", "4", "2", "1", "$\frac{2}{3}$", "$\frac{1}{3}$" of the film sensitivity corresponding to the APEX value, whereby the operation is carried out in such a manner that the closing of the switch corresponds with "0", while the opening corresponds with "1". Thus the above mentioned switch 4 is selectively opened and closed as is shown in FIG. 5 for the film speed corresponding to the APEX value given with the $\frac{1}{3}$ step precision. The one end of each bit $a8$, $a4$, $a2$, $a1$, $a\frac{2}{3}$, $a\frac{1}{3}$ of the switch is grounded while the other end is connected to the current source V through the resistance and at the same time to each bit $a8$, $a4$, $a2$, $a1$, $a\frac{1}{2}$, $a\frac{1}{4}$ of the register. Futher the 2 bits of the lower order $a\frac{2}{3}$ and $a\frac{1}{3}$ of the above mentioned switch are connected to the bit of the lowest order $a\frac{1}{2}$ of the above mentioned register.

In the case of the output for which the film speed corresponds with the $\frac{1}{3}$ step or the $\frac{2}{3}$ step in the APEX value with the above mentioned composition, "1" stands for the bit of the lowest order $a\frac{1}{2}$ with the weight "$\frac{1}{2}$" of the register through the OR gate. At the same time, in case of the input of the $\frac{2}{3}$ step "1" stands for the bit $a\frac{1}{2}$ with the weight "$\frac{1}{2}$" of the register 6, while in case of the input of the $\frac{1}{3}$ step "1" stands for the bit $a\frac{1}{4}$ with the weight "$\frac{1}{4}$" of the register 6. Further, in case of the inputs above "1" in the APEX value, these data are put in the bits $a8$, $a4$, $a2$ and $a1$ respectively with the weight "8", "4", "2" and "1" of the register.

As explained above in accordance with the selection of the combination of the 6 bits of the switch 4 as is shown in FIG. 5, the film sensitivity information put in the APEX value with the $\frac{1}{3}$ step precision is put in the 7 bit register 6 in the APEX value with the $\frac{1}{2}$ step precision in an approximate way as is shown in FIG. 3.

Hereby the case the set input data are entered in parallel into the 7 bit register is shown as an example in FIG. 4, while the present invention is also sufficiently applicable for the case the data are entered a dynamic register in series.

Figure 6:
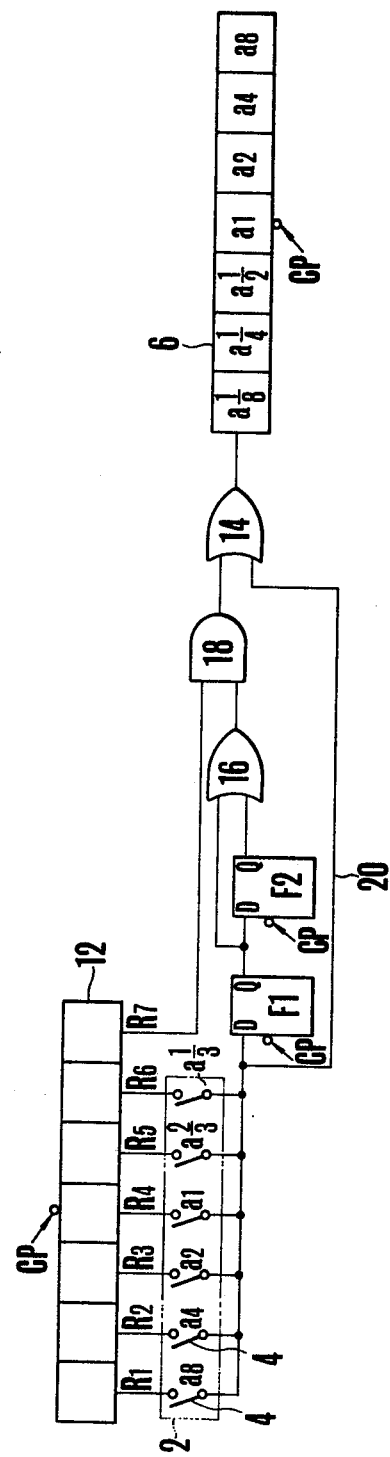
FIG. 6 shows another circuit composition in which an embodiment of the digital information input method in accordance with the present invention is applied.

FIG. 6 shows another circuit composition in which an embodiment of the digital information input method in accordance with the present invention is applied. In the drawing, 4 is a switch composed in the same way as that shown in FIG. 4, and 6 the 7 bit shift register driven in a dynamic way. In the composition shown in FIG. 6, the closing of each bit $a8$, $a4$, $a2$, $a1$, $a\frac{2}{3}$ and $a\frac{1}{3}$ of the switch 4 corresponds with the data "1", while the opening corresponds with the data "0". 12 is a ring counter for successively applying the signal voltages $R_1$, $R_2$, $R_3$, $R_4$, $R_5$ and $R_6$ to the bits $a8$, $a4$, $a2$, $a1$, $a\frac{2}{3}$ and $a\frac{1}{3}$ of the above mentioned switch 4 and for producing a signal voltage $R_7$ for another bit, in such a manner that the opened and the closed state of the above mentioned switch 4 is converted in signals obtained in a time series way. Hereby the ring counter 12 and the shift register 6 is synchronously driven by means of clock pulses with the same period.

The outputs of the bits of the above mentioned switch 4 are summarized into one so as to be put in the OR gate and at the same time to the D input terminal of the Flip-Flop F1 while the Q output of the Flip-Flop F1 is put in the D input terminal of the Flip-Flop F2. The Q outputs of the Flip-Flops F1 and F2 are put in the OR gate 16. The output of the above mentioned OR gate 16 is put in the AND gate in whose other terminal of the output R7 of the above mentioned ring counter 12 is put, while the output of the AND gate 18 is put in the OR gate 14. The output of the above mentioned OR gate 14 is successively put in the register 6 from the figure of the lower order.

As is shown in the time chart of FIG. 7, outputs R1, R2 . . . R7 of the above mentioned ring counter 12 successively produce "1" in synchronization of the clock pulse CP, whereby such "1" output is put in the register 6 from the OR gate through the signal conductor 20 when the corresponding switch 4 is closed. Hereby the figure of the lowest order of the shift register 6 corresponds with the bit $a8$ with the weight "8" when the R1 output of the ring counter is "1", with the bit $a4$ with the weight "4" when the R2 output is "1", with the bit $a2$ with the weight "2" when the R3 output is "1", with the bit $a1$ with the weight "1" when the R4 output is "1", with the bit $a\frac{1}{2}$ with the weight "$\frac{1}{2}$" when the R5 output is "1", with the bit $a\frac{1}{4}$ with the weight "$\frac{1}{4}$" when the R6 output is "1" and with the bit $a\frac{1}{8}$ with the weight "$\frac{1}{8}$" when the R7 output is "1". In consequence while the ring counter 12 makes one course, whether each bit $a8$, $a4$, $a2$, $a1$, $a\frac{2}{3}$ and $a\frac{1}{3}$ of the switch is in the opened state or in the closed state is detected whereby the output signal R1-R6 corresponding to the switch 4 in the closed state can be memorized in the bit $a8$, $a4$, $a2$, $a1$, $a\frac{1}{2}$ and $a\frac{1}{4}$ of the register 6. When there are data with the weight "$\frac{2}{3}$" or "$\frac{1}{3}$" it is necessary to set "1" to the bit $a\frac{1}{8}$ with the weight "$\frac{1}{8}$" of the register 6, for which purpose the Flip-Flops F1 and F2 are provided. Namely, as is clear from the example 1 of the time chart in FIG. 7, when the switch $a\frac{2}{3}$ corresponding to the data "$\frac{2}{3}$" of the switch 4 is closed, the R5 output of the ring counter 12 is given to the figure of the lowest order of the register 6 through the OR gate 14 so that "1" is set to the bit $a\frac{1}{2}$ of the figure of the lowest order of the register 6 with the weight "$\frac{1}{2}$" at the same time with R5 output, at the same time the above mentioned R5 output is given to the D input terminal of the Flip-Flop F1, then in synchronization with the falling down of the next clock pulse the Q output of the Flip-Flop F1 is "1", and then in synchronization with the falling down of the next clock pulse the Q output of the Flip-Flop F2 in whose D input terminal such Q output of F1 is put becomes "1". Consequently the output of the OR gate 16 in which the Q outputs of the above mentioned Flip-Flops F1 and F2 are put becomes as is shown in FIG. 7, whereby the output is taken out as a signal synchronized with the R7 output by means of the AND gate 18 in which the R7 output of the ring counter 12 is put and is memorized in the bit $a\frac{1}{8}$ of the lowest order of the register 6 with the weight "$\frac{1}{8}$". Further, when the switch $a\frac{1}{8}$ corresponding to the data of "$\frac{1}{8}$" of the switch 4 is closed, as is clear from the example 2 of the time chart in FIG. 7, the R6 output of the ring counter 12 is given to the figure of the lowest order of the register 6 through the OR gate 14 so that at the same time with the R6 output "1" is set to the bit $a\frac{1}{4}$ of the lowest order of the register 6 with the weight "$\frac{1}{4}$" at the same time the above mentioned R6 output is given to the D input terminal of the Flip-Flop F1 in such a manner that after the same operation as in case of the example 1 the Q outputs of the Flip-Flops F1 and F2 successively become "1" so that the output of the OR gate 16 becomes as is shown in FIG. 7, and is taken out as a signal synchronized with the R7 output of the ring counter 12 by means of the AND gate 18 and memorized in the bit $a\frac{1}{8}$ with the weight "$\frac{1}{8}$" in the same way as mentioned above.

After the above mentioned operation, the output selected by means of the switch 4 with the $\frac{1}{4}$ step precision is converted into an information in an approximate way and memorized.

As explained above in accordance with the present invention by means of a remarkably simple composition a digital information given with the $\frac{1}{4}$ step precision can be converted with the $\frac{1}{8}$ step precision so that a novel digital information input method can be obtained by means of which method it is made possible to adopt the information with the $\frac{1}{4}$ step precision to the system in accordance to which the operation is carried out with the $\frac{1}{2}$ step precision, the $\frac{1}{4}$ step precision, or the $\frac{1}{8}$ step precision convenient for the digital handling.

What is claimed is:

1. A digital information input circuit arrangement comprising:
    a plural number of switches arranged parallel to each other so as to be selectively opened and closed, said plural number of switches including a first switch corresponding to the weight $\frac{2}{8}$ in APEX value and a second switch corresponding to the weight $\frac{1}{8}$ in APEX value;
    an $n$ bit register, said register including a first bit with the weight $\frac{1}{2}$ in APEX value, a second bit with the weight $\frac{1}{4}$ in APEX value and a third bit with the weight $\frac{1}{8}$ in APEX value;
    a signal producing means being connected to the plural number of switches so as to produce closing signals by means of the selective closing of the plural number of switches to be transferred to the register, and
    a transfer means from transferring to the register the closing signals due to the closing of the plural number of switches, said means including a first transfer means for transferring the closing signal of the first switch to the first bit, the closing signal of the second switch to the second bit and the closing signal of the first and the second switch to the third bit.

2. A digital information input circuit arrangement in accordance with claim 1, wherein the third transfer means including an OR gate.

3. A digital information input circuit arrangement in accordance with claim 2 wherein the signal producing means includes a current source and resistances provided between the current source and each of the plural number of switches.

4. A digital information input circuit arrangement comprising:
    a plural number of switches arranged parallel to each other so as to be selectively opened and closed, said plural number of switches including a first switch corresponding to the weight $\frac{2}{8}$ of an APEX value and a second switch corresponding to the weight $\frac{1}{8}$ in APEX value;
    an $a$ bit register, said register including a first bit with the weight $\frac{1}{2}$ in APEX value, a second bit with the weight $\frac{1}{4}$ in APEX value and a third bit with the weight $\frac{1}{8}$ in APEX value;
    an $n$ bit counter for successively producing timing pulses, said counter including a first bit for producing a pulse by the closing of the first switch for the register, a second bit producing a pulse by the closing of the second switch for the register and a third bit always producing pulses for the register; and
    a transfer means for transferring the pulses from the counter to the register, said means including a first transfer means for transferring to the register the pulses by means of the closing of the plural number of switches and a second transfer means for transferring the pulse from the third bit of the counter to the register, said second transfer means presenting a means for detecting the pulse by means of the closing of the first or the second switch.

* * * * *